US009535736B2

(12) United States Patent
Jorgensen et al.

(10) Patent No.: US 9,535,736 B2
(45) Date of Patent: Jan. 3, 2017

(54) PROVIDING SERVICE QUALITY LEVELS THROUGH CPU SCHEDULING

(71) Applicant: Amazon Technologies, Inc., Seattle, WA (US)

(72) Inventors: Atle N. Jorgensen, Cape Town (ZA); Marcin Kowalski, Cape Town (ZA); Colin L. Lazier, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/578,148

(22) Filed: Dec. 19, 2014

(65) Prior Publication Data

US 2015/0178116 A1    Jun. 25, 2015

Related U.S. Application Data

(63) Continuation of application No. 12/975,211, filed on Dec. 21, 2010, now Pat. No. 8,918,784.

(51) Int. Cl.
| | |
|---|---|
| *G06F 9/455* | (2006.01) |
| *G06F 9/46* | (2006.01) |
| *G06F 9/50* | (2006.01) |
| *G06F 9/48* | (2006.01) |

(52) U.S. Cl.
CPC .......... *G06F 9/45558* (2013.01); *G06F 9/455* (2013.01); *G06F 9/4881* (2013.01); *G06F 9/5038* (2013.01); *G06F 9/5077* (2013.01); *G06F 2009/4557* (2013.01); *G06F 2009/45595* (2013.01); *G06F 2209/504* (2013.01); *G06F 2209/5021* (2013.01); *Y02B 60/142* (2013.01)

(58) Field of Classification Search
None
See application file for complete search history.

(56) References Cited

U.S. PATENT DOCUMENTS

| | | |
|---|---|---|
| 8,127,295 B1 | 2/2012 | Jones et al. |
| 8,127,298 B2 | 2/2012 | Kato et al. |
| 8,141,096 B1 | 3/2012 | Tormasov et al. |
| 8,146,079 B2 | 3/2012 | Gupta et al. |

(Continued)

OTHER PUBLICATIONS

How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.

(Continued)

*Primary Examiner* — Tammy Lee
(74) *Attorney, Agent, or Firm* — Knobbe, Martens, Olson & Bear, LLP (57) ABSTRACT

In this disclosure, a resource scheduler is described that allows virtual machine instances to earn resource credits during the low activity levels. Virtual machine instances that spend a predominant amount of time operating at low activity levels are able to quickly gain resource credits. Once these virtual machine instances acquire enough resource credits to surpass a threshold level, the resource scheduler can assign a high priority level to the virtual machine instances that provide them with priority access to CPU resources. The next time that the virtual machine instances enter a high activity level, they have a high priority level that allows them to preempt other, lower priority virtual machine instances. Thus, these virtual machine instances are able to process operations and/or respond to user requests with low latency.

20 Claims, 6 Drawing Sheets

(56) References Cited

U.S. PATENT DOCUMENTS

| | | | |
|---|---|---|---|
| 8,185,903 B2 | 5/2012 | Fulton et al. | |
| 8,219,996 B1 | 7/2012 | Morris | |
| 2002/0053011 A1* | 5/2002 | Aiken et al. | 711/170 |
| 2003/0023660 A1 | 1/2003 | Kosanovic | |
| 2006/0150190 A1 | 7/2006 | Gusler et al. | |
| 2006/0190482 A1 | 8/2006 | Kishan et al. | |
| 2006/0230400 A1* | 10/2006 | Armstrong | G06F 9/5077 718/1 |
| 2008/0022280 A1* | 1/2008 | Cherkasova | G06F 9/4881 718/102 |
| 2008/0028076 A1* | 1/2008 | Gupta et al. | 709/226 |
| 2008/0028410 A1 | 1/2008 | Cherkasova et al. | |
| 2008/0163230 A1 | 7/2008 | Latorre et al. | |
| 2009/0007120 A1 | 1/2009 | Fenger et al. | |
| 2010/0023940 A1 | 1/2010 | Iwamatsu et al. | |
| 2011/0202927 A1 | 8/2011 | Miloushev et al. | |
| 2011/0225299 A1 | 9/2011 | Nathuji et al. | |

OTHER PUBLICATIONS

B. Pfaff, et al., Extending Networking into the Virtualization Layer, Proceedings of the $8^{th}$ ACM Workshop on Hot Topics in Networks (HotNets—VIII), New York City, New York (Oct. 2009).

A. Greenberg, et al., Towards a Next Generation Data Center Architecture: Scalability and Commoditization, dated Aug. 22, 2008.

P. Barham, et al., Xen and the Art of Virtualization, SOSP'03, Oct. 19-22, 2003.

Govinda, et al., Xen and Co.: Communication-aware CPU Scheduling for Consolidated Xen-based Hosting Platforms, VEE'07, Jun. 13-15, 2007.

Credit-Based CPU Scheduler, wiki.xensource.com/xenwiki/CreditScheduler, dated Nov. 15, 2007.

Amazon EC2 FAQs, aws.amazon.com/ec2/faqs/, Nov. 3, 2009 version stored by wayback.archive.org, downloaded Jul. 11, 2011.

* cited by examiner

PROVIDING SERVICE QUALITY LEVELS THROUGH CPU SCHEDULING

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Computers may emulate hardware to provide the appearance of hardware that does not actually exist to an operating system, application, logic, or process. Computers may also use emulation to partition one hardware function between multiple operating systems, applications, and so on. This emulation may also be referred to as virtualization.

Virtualization may be accomplished by mechanisms including, for example, pure software virtualization, hardware supported software virtualization, and the like. Software virtualization facilitates emulating hardware on a variety of processors, particularly if the virtualization code is written in a portable, structured manner. Hardware virtualization may require hardware functions to be designed into an underlying chip With the introduction of virtualization technology, a computing service provider can now provide computing resources to customers dynamically and/or in a scalable manner. As the computing resource demands of the customer increase, the computing service provider can allocate additional computing resources in the form of virtual machine instances. For example, such resources can be provided to the customer as part of a virtual network connectable to the customer's own physical network.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

With the advent of virtualization technologies the same physical computing resource can be shared transparently by multiple users. Virtualization allows the shared computing resource to appear to be solely under each user's control while in actuality, the computing resource may be operating multiple virtual machine instances at a time. For example, virtualization technologies such as those provided by VMware, XEN, or User-Mode Linux can be adapted to allow a single physical computing machine to be shared among multiple virtual networks by providing one or more virtual machine instances (VMIs) simulated in software by the single physical computing machine, with each virtual machine acting as a distinct logical computing system. These virtualized environments take advantage of the fact that most computing resources are underutilized most of the time.

Typically, the number of virtual machine instances supportable by a computing system is limited by, among other things, the amount of central processing unit (CPU) time available. Further, there may be tradeoffs in responsiveness versus efficiency based on the number of virtual machine instances allocated to a single computing system. Too many virtual machine instances can lead to low responsiveness for each virtual machine if a virtual machine instance does not have sufficient CPU resource for a sufficient time to complete an operation. On the other hand, fewer virtual machines increases responsiveness while reducing efficiency by allowing computing resources to remain idle or underutilized for long periods of time. One potential solution is to shape CPU usage of virtual machines to facilitate prioritized access or bursting, where a virtual machine instance receives priority access to one or more CPUs for a time period and may be able to utilize up to 100%, near 100%, a majority, or some other portion of a CPU as needed for that time period and/or until an operation is complete. For example, a virtual machine operating a web server can be provided prioritized access when operating at a high activity level when processing page requests while allowed to operate at a background level at other times when no requests are being processed and is utilizing little or no computing resources. By shaping CPU usage of multiple virtual machines to occur in bursts of priority access operations and staggering the priority access operations of multiple virtual machines, the responsiveness of individual virtual machines remain high as well as the efficiency of the computing system emulating the virtual machines. This mechanism can be used to provide quality of service guarantees for CPU resources as well as other computing resources.

In this disclosure, techniques are described for providing service quality levels for certain types of virtual machine instances. For example, techniques are disclosed for allowing certain virtual machine instances to have prioritized access to the computing resources in a virtualized environment. In one embodiment, a resource scheduler provides resource credits to virtual machines instances. During operation of the virtual machine instances, resource credits are consumed based on the amount of the computing resources utilized by each virtual machine instance. Typically, the amount of computing resource utilized determines the amount of resource credits consumed. If a virtual machine instance has sufficient credits, it can receive priority access to computing resources. In one embodiment, a virtual machine instance in priority access mode remains in priority access mode without consuming resource credits until it's interrupted. On the other hand, if a virtual machine instance's resource credits fall below a threshold level, the virtual machine instance's utilization of computing resources can be limited, for example, by using a resource limit or cap, until its resource credits increase. This can free up computing resources for other virtual machines, enabling higher priority virtual machine instances to utilize the reserved computing resources and operate more quickly when needed. Periodically, additional resource credits are provided to the virtual machine instances and/or computing resources re-allocated based on the new resource credit amounts.

Figure 1:
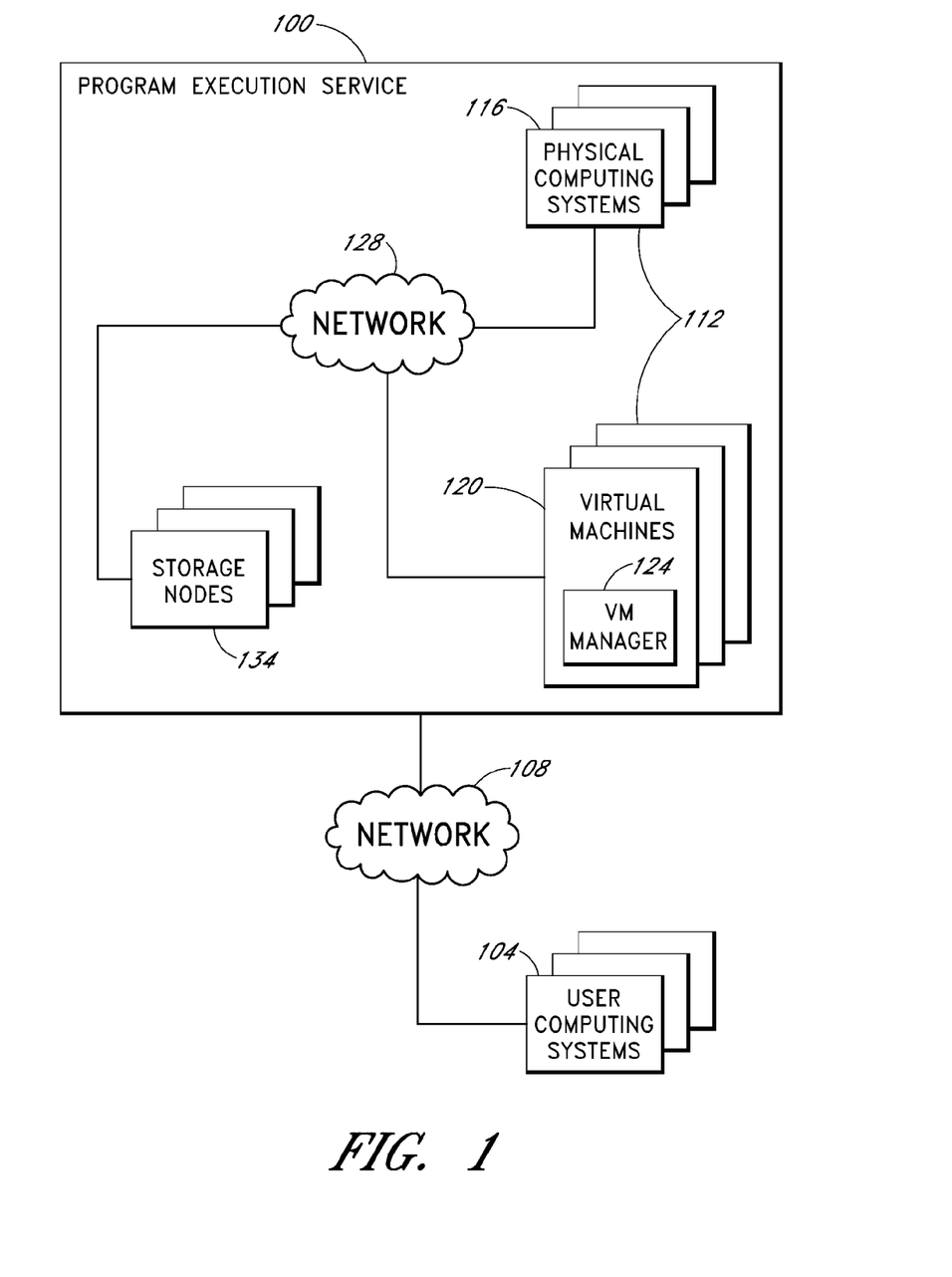
FIG. 1 is a network diagram schematically illustrating an example of a program execution service that can provide computing resources to multiple user computing systems via a communication network.

FIG. 1 is a network diagram schematically illustrating an example of a program execution service 100 that can provide computing resources to multiple user computing systems 104 via a communication network 108. For example, the program execution service 100 can manage requests from a user to execute a program, or set of programs, on behalf of the user. At least some of the user computing systems 104 may be remote from the program execution service 100. In this example, users can use the computing systems 104 to access the program execution service 100 over the communication network 108. The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include one or more private networks with access to and/or from the Internet.

The program execution service 100 provides a variety of functionality for managing execution of programs for multiple users. In the example illustrated in FIG. 1, the program execution service 100 comprises a plurality of computing nodes 112 that can execute programs on behalf of the users. The computing nodes 112 may comprise one or more physical computing systems 116 and/or one or more virtual machines 120 that are hosted on one or more physical computing systems. For example, a host computing system may provide multiple virtual machines instances 120 and include a virtual machine ("VM") manager 124 to manage those virtual machines instances (e.g., a hypervisor or other virtual machine monitor).

In the example illustrated in FIG. 1, each of the computing nodes 112 has some amount of computing resources available for executing one or more programs. Each computing node 112 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, I/O operations, or the like. In some embodiments, the program execution service 100 may provide preconfigured computing nodes 112, with each preconfigured computing node having similar and/or equivalent amounts of resources available for executing programs on behalf of users. In other embodiments, the program execution service 100 may provide a selection of various different computing nodes 112 from which a user may choose for executing programs on behalf of the user. In some such embodiments, the computing nodes 112 may have varying amounts and/or types of computing resources (e.g., size, speed and/or type of processing units; number of processing units; amount of memory and/or storage; platform configuration, such as 32-bit or 64-bit, operating system, or the like).

The program execution service 100 may provide user computing systems 104 with access to storage nodes 134 that provide mass storage of data, programs, and other user information. The storage nodes 134 may comprise any type of persistent data storage, for example non-volatile memory devices such as, e.g., hard disk drives, optical disk drives, or the like In the example illustrated in FIG. 1, the computing nodes 112 can access the storage nodes 134 via a network 128. The network 128 may include multiple networking devices (not shown) such as, e.g., switches, edge routers, core routers, or the like The network 128 may, but need not be, a different network than the network 108 shown in FIG. 1.

Users of the program execution service 100 can interact with the program execution service 100 to request preferred and/or required resources of the program execution service (e.g., program execution capacity and/or storage resources). The program execution service 100 can receive requests for resources from the user computing systems 104 over the network 108. A user may request that the service 100 provide one or more computing nodes for execution of a program (or programs) on behalf of the user (or other users authorized by the user). In various embodiments, computing resources may be specified at the time of a request for execution of programs on behalf of a user and/or at one or more other times, such as when a user registers and/or subscribes to use services of the program execution service 100. In some embodiments, the program execution service 100 may provide subscription and/or registration services to one or more users, such that users may specify information related to one or more programs to execute on behalf of a user (e.g., programs, source code, addressable locations of one or more programs, or the like), account information (e.g., user name, billing information, or the like), terms of use, or the like In some embodiments, after a user interacts with The program execution service 100 to subscribe and/or register for services, the user may be issued one or more request identifiers (e.g., keys, tokens, user names, passwords, or the like) that are associated with the user and are to be used in conjunction with executing programs on behalf of the user.

In some embodiments, one or more modules of the program execution service 100 is executed or embodied by one or more physical or virtual computing systems. For example, in some embodiments, a server computing system that has components including a CPU, I/O components, storage, and memory may be used to execute the one or more modules. The I/O components include a display, a network connection to the network 128, a computer-readable media drive, and other I/O devices (e.g., a keyboard, a mouse, speakers, or the like). In one embodiment, one or more modules of the program execution service 100 can be stored as one or more executable program modules in the memory of the server, and the program execution service 100 can interact with computing nodes 112 (e.g., physical computing systems 116 and/or virtual machines 120) over the network 128. The program execution service 100 can receive requests from users for computing resources via the network 108.

Figure 2:
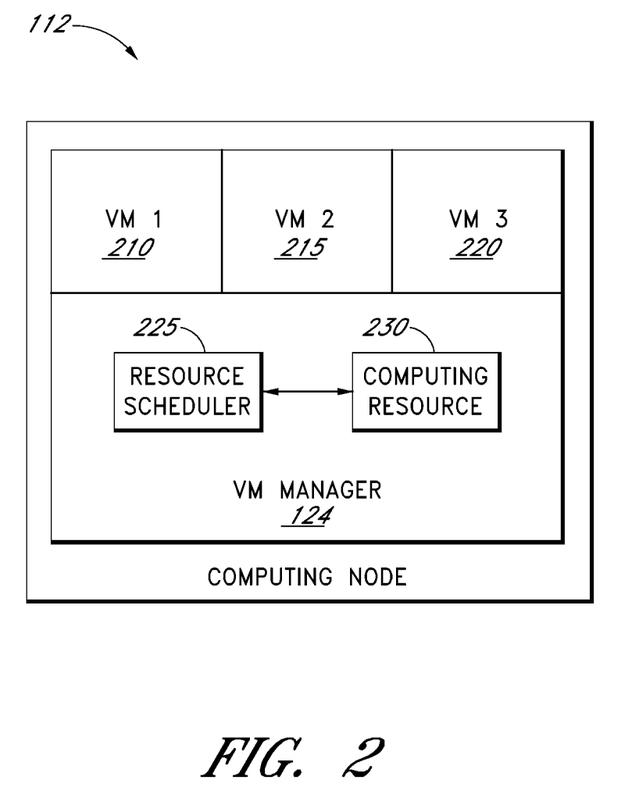
FIG. 2 is a block diagram that illustrates an embodiment of a computing node for operating virtual machine instances.

FIG. 2 is a block diagram that illustrates an embodiment of a computing node 112 for operating virtual machine instances, such as the computing nodes described above in FIG. 1. In one embodiment, a Virtual Machine ("VM") manager 124 allows multiple operating systems to run concurrently on the computing node through hardware virtualization. The VM manager can schedule across the physical CPU(s) of the computing node. The VM manager may also provide guest operating systems a virtual operating platform and monitor the execution of the guest operating systems. Multiple instances of a variety of operating systems operating on one or more virtual machine instances 210,

215, 220 may share the virtualized hardware resources. In one embodiment, the VM manager comprises a hypervisor or virtual machine manager. The VM manager may also comprise a first guest operating system or domain 0 (dom0), which may boot automatically when the hypervisor boots and receive management privileges and direct access to the physical hardware by default. The system administrator can use the VM manager to manage guest operating systems or virtual machine instances.

In some embodiments, the VM manager 124 comprises a resource scheduler 225, such as a CPU scheduler, that manages one or more CPUs or other computing resources 230. The resource scheduler can allocate or assigns a CPU resource to a virtual machine instance 210, 215, 220, allowing the virtual machine to operate for a particular time period. The resource scheduler can manage a scheduling queue of virtual machine instances waiting to receive a computing resource. For example, the resource scheduler may make scheduling decisions by selecting a virtual machine to operate after a clock interrupt, an I/O interrupt, an operating system call, a timer signal or another form of signal.

In one embodiment, the resource scheduler 225 is able to forcibly remove a virtual machine from a computing resource when it decides to allocate that computing resource to another virtual machine. In one embodiment, the resource scheduler allocates the computing resource to a new virtual machine for a time period, but waits to remove the computing resource from the current virtual machine after the time slice ends. In some embodiments, the resource scheduler 225 can be used for other computing resources, such as, for example, memory, storage space, network bandwidth or the like.

The resource scheduler 225 may allocate resources using one or more of a variety of scheduling algorithms. For example, the resource scheduler 225 may use first in first out (FIFO), where the scheduling queue is processed in the order that virtual machine instances arrive in the queue. Another scheduling algorithm is shortest remaining time where the CPU scheduler arranges virtual machine instances with the least estimated time remaining to be next in the scheduling queue. Another possible scheduling algorithm is fixed priority pre-emptive scheduling where the virtual machine instances are assigned a priority and allocated accordingly. In round-robin scheduling, the scheduler assigns a fixed time unit per virtual machine and cycles though the virtual machine instances. In multilevel queue scheduling, virtual machine instances are divided into different groups with different scheduling priorities where virtual machine instances in higher level queues are scheduled to operate first. Many other scheduling algorithms are available and can be used by the CPU scheduler, such as quota scheduling and credit scheduling, which are described below.

In an example scenario, a 4-CPU computing node operates 160 virtual machine instances, where each virtual machine instance can be expected to receive $4/160$ or $1/40$ of the available CPU time on the box. For example, with 30 ms CPU time slices for the computing node, a virtual machine instance can be ordinarily expected to receive a 30 ms slot for approximately every 1200 ms time period. However, a quota scheduler can provide virtual machine instances with uncontested CPU time for at least some of the time. In the example, during a 24 hour time period, a virtual machine instance can be expected to receive 36 minutes, some portion of which can be uncontested. For example, a virtual machine instance may receive 10 minutes of uncontested or priority access CPU time, which may be continuous or split into multiple time periods, such as 1 minute, 10 seconds, 1 second, 100 ms, 10 ms, and/or other time period. By providing uncontested time, the quota scheduler reduces the latency of the virtual machines.

Using the example scenario, a resource scheduler 225 can allocate CPU time to a virtual machine instance operating a network application, such as a web server. As network applications can be latency sensitive, the network application can benefit having priority access to CPU usage for short periods, for example, while serving a web page, responding to a user, and/or conducting other operations. The virtual machine instance likely conducts minimal or non-existent processing between operations. While inactive or minimally active, the virtual machine instance can be accruing resource credits between the operations, thereby having enough resource credits for priority access operation during its next operation. Thus, latency can be minimized.

In comparison, if the resource scheduler implemented a hard capped algorithm or uncapped contention system, it could take in the order of (30 ms*160/4=) 1200 ms before the network application receives a 30 ms slot to conduct an operation, such as serving web pages. Thus, the latency could be 1200 ms before an operation begins. In addition, if 30 ms time slice of CPU time is not enough to complete the operation in one round, the operation could take multiples of 1200 ms time periods to complete. This can lead to a poor user experience, for example, as the user waits for seconds for a web page to load.

One potential solution is the use of a resource scheduler 225 that provides priority access to computing resources to virtual machine instances operating in short bursts or otherwise having shorter periods of high activity compared to longer periods of low activity. In one embodiment, the resource scheduler 225 comprises a credit scheduler. In one implementation, each virtual machine instance has an associated weight and cap. The weight determines the share of the computing resource, such as physical CPU time, that the virtual machine instance receives, whereas the cap represents the maximum time. In one embodiment, the weights are relative while the cap is an absolute value. Typically, the credit scheduling algorithm is work-conserving. Given two virtual machine instances with priorities of 128 and 256 (weight), the first gets half as much CPU time as the second while both are busy, but can use the whole CPU if the second is idle. The cap can be used to force a non-work-conserving mode. If all virtual machine instances have a cap, and the sum of all caps is below the total CPU capacity, the scheduler does not run any virtual machine instances for some of the time, potentially leaving some CPU idling.

The credit scheduler ("CS") transforms the weight (and cap) into a resource credit allocation for each virtual machine instance, which may be implemented in a separate accounting process. As a virtual machine instance runs, it consumes resource credits ("CS credits"). Once the virtual machine instance runs out of resource credits, it only runs when other virtual machine instances with greater resource credits have finished executing. Periodically, the credit scheduling algorithm or accounting process goes through and gives virtual machine instances more credits.

In one embodiment, the credit scheduler classifies virtual machine instances into two categories: active or nonactive, and uses three priority levels: UNDER, OVER, and BOOST. Active virtual machine instances earn credits every time slice according to their weights, and consume credits as they run. Active virtual machine instances can be in either priority UNDER by having positive resource credit, or priority OVER by having negative or a lack of resource credits (e.g. zero or less). virtual machine instances with priority of UNDER run ahead of virtual machine instances with priority of OVER. Scheduling within for virtual machine instances with the same priority level can be round-robin, though other scheduling algorithms can be used. In one embodiment, non-active virtual machine instances do not earn or consume credits as they run. As soon as a non-active virtual machine instance is woken, it can be set to priority BOOST, which allows it to run ahead of any virtual machine instance in UNDER or OVER. As will be apparent, the terms UNDER, OVER, and BOOST represent priority levels and are not meant to be limiting. The priority levels may use others names, designations, or numerical values. Further, any number of priority levels may be used, such as a two-level system using BOOST and NORMAL.

Movement between the two classifications happens as follows: If an active virtual machine instance is not using its entire fair share (e.g. the available resource time divided by the number of virtual machine instances), it will slowly accumulate credit. In one embodiment, once it reaches a certain threshold (e.g. 30 ms worth of credit), it is marked inactive, its credits are discarded (e.g. set to zero), and the next time it wakes it will be marked BOOST. In one embodiment, a virtual machine instance in BOOST priority is marked active again if it is interrupted by a tick interrupt, which marks the end of a time period. For example, tick interrupts can be set to occur every 10 ms, though other time periods may be used. The tick serves to probabilistically debit credit and/or to detect virtual machine instances to mark as active, for example, if the virtual machine instance is consuming a non-negligible amount of CPU resources.

Probabilistically speaking, every virtual machine instance can be expected to eventually be interrupted by a tick. For example, suppose a virtual machine instance consumes 10% of the CPU resources while serving web pages. This means that each time a tick fires, there's a 10% chance that the virtual machine instance is running. Thus, on average, the tick can be expected to interrupt the virtual machine instance every 10 ticks or so. If ticks happen every 10 ms, a virtual machine instance using 10% of the CPU can be expected to stay in BOOST priority for 100 ms before switching to being actively accounted. So any virtual machine instance which is not using up its resource credits can flip back and forth between "active" and "non-active" categories. When active, the virtual machine instance accumulates credit until it reaches the credit limit, and be marked inactive. When inactive, it will eventually be interrupted by a tick and marked active. In one embodiment, at the point where the virtual machine instance is made active again, it has zero credit, so it will likely begin by going into OVER and be scheduled behind other active virtual machine instances. Even when the virtual machine instance goes back into UNDER, it will be competing (e.g. using round-robin) with all virtual machine instances that haven't used up their credit yet.

In some embodiments, the resource scheduler 225 comprises a quota scheduler ("QS"). In one embodiment, the quota scheduler can be implemented using a modified credit scheduler, where the modification introduces a CPU time quota mechanism that allows a certain amount of priority access or uncontested CPU usage (time) while imposing a limit on the average CPU time spending rate, in order to shape CPU usage.

In one embodiment, the quota scheduler is configured to provide priority access to one or more processors of a computing system to virtual machines instances that utilize the one or more processors above a first threshold level (e.g. high activity level) for short durations of time relative to long durations of time utilizing the one or more processors below a second threshold level (e.g. low activity level). In order to determine whether a virtual machine instance operates at a high or low activity level, the quota scheduler can refer to the historical processor usage of the virtual machine instance. In one embodiment, the historical processor usage of a virtual machine is indicated by the amount of resource credits associated with the machine. For example, positive resource credits can indicate that the virtual machine tends to operate at low activity levels while negative resource credits can indicate that the virtual machine tends to operate at high activity levels. The quota scheduler can examine multiple processor time periods in making the determination, where a processor time period can be the unit of time for which the scheduler schedules access to the processor. The processor time periods examined by the scheduler can be continuous or discontinuous.

In one embodiment, the quota scheduler proceeds by:
1. Providing resource credits ("qcredits") to a virtual machine instance every quota time period (e.g. 6 seconds, 10 seconds, at least 1 second, or any other time period).
2. If a virtual machine instance is active, debiting qcredits from the virtual machine instance every credit scheduler tick period (e.g. 10 ms in the example above).
3. Checking for overspending virtual machine instances every quota time period, which are virtual machine instances using more than their currently accrued quota (e.g. credit quota is negative).
4. For overspending virtual machine instances, slowing the overspending virtual machine instance's CPU time spending rate by decreasing the virtual machine instance's cap, for example, by reducing the cap asymptotically to zero as long as the overspending continues. Over time, this results in the virtual machine instance accruing qcredits faster than spending them and once the qcredits>0, the capping can be removed.

The qcredit of the quota scheduler may be different from the CS credits that are used by the credit scheduler. In one embodiment, both CS credits and qcredits are a representation of possible CPU utilization over a given time aggregation. However, whereas the CS credits are used as a mechanism for managing fairness down to a millisecond level, (e.g. accounting for usage every 30 ms), the qcredits are accounted for every quota time period (e.g. 6 seconds) and are used to control or shape the pattern of CPU time spending. In one embodiment, the qcredits are accrued as a % of the maximum amount of qcredits a virtual machine instance can possibly spend during the quota time period. In one embodiment, the qcredits are reduced when a virtual machine instance is active, for example, during the CS accounting tick (e.g. 10 ms).

In one embodiment, there is an upper limit to the amount of qcredits that can be accrued in order to bound the size of a potential CPU time spending burst. Other variables that may be changed to affect the performance characteristics of the system are the asymptotic function (deciding how steeply to decrease the cap after a period of overspending), accounting period (quota time period), and/or a lower limit on the cap. The accounting period length controls for how long it takes for the QS to notice that someone has been using more than their quota and then react to it. The lower limit on the cap can provide a minimum CPU time for a virtual machine instance. In one embodiment, lower limit on the cap is enforced when there is no contention on box; if there is contention or contention is above a particular threshold level, then another policy, such as round-robin can be used in order to avoid over-subscription of computing resources.

The main difference in the characteristics of the CS and QS under contention is the way that modest CPU time spending virtual machine instances are treated. Under the credit scheduler, if a virtual machine instance that has not been running for a while wakes up, it typically only get a round-robin fair share (however it can also receive an initial boost, e.g. 30 ms), and on a 160 instance box, a round robin policy can take a long time (around 1200 ms in the example discussed) and result in poor latency. Under the quota scheduler such a virtual machine instance will be high in resource credits and hence uncapped, while all the high spenders will be capped. As a result, the virtual machine instance waking up will get much higher priority and hence more CPU time. In one embodiment, the virtual machine instance can also earn additional resource credits when operation. If several "savers" are waking up uncapped at the same time, these together will compete amongst each other for resources, but will be in a higher priority level than the high spenders that are capped. Thus, virtual machine instances with short periods of high intensity CPU usage will generally have higher priority when active than other virtual machine instances.

Figure 3:
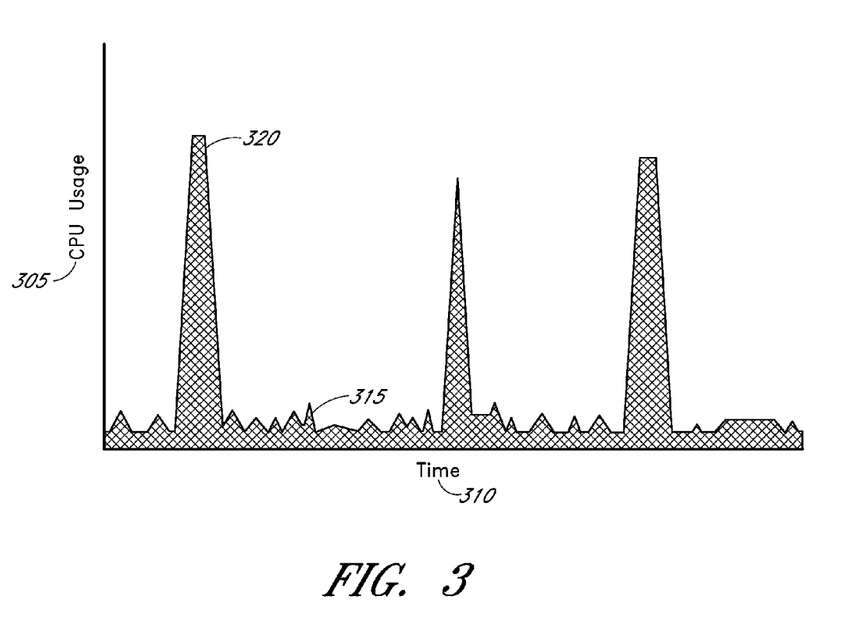
FIG. 3 illustrates an example of a CPU usage profile for one embodiment of a virtual machine instance that can benefit from a resource scheduler implementing quota scheduling.

FIG. 3 illustrates an example of a CPU usage profile for one embodiment of a virtual machine instance that can benefit from a resource scheduler 225 implementing quota scheduling. CPU usage 305 is illustrated on the Y-axis with Time 310 on the X-axis. The virtual machine instance operates with its CPU usage at essentially two activity levels: at low or background activity levels 315, and then at brief spiked high activity levels 320 significantly higher than the background level. The amount of CPU usage utilized during high activity levels varies depending on the computing resources of the computing node and/or the amount of computing resources needed by the virtual machine instance. For example, if the computing node comprises 2 CPUs, the peak level can correspond to utilizing most of those 2 CPUs or a significant fraction of the available computing time for those CPUs. The ratio between the high level and the low level can be large, reflecting periods when many operations are processed versus periods when no or few operations are processed. For example, the high level may be 50-100%, 40-100%, or 30-100% while the low level may be 0-50%, 0-40%, or 0-30% of CPU capacity. Other levels may also be used.

In one embodiment, high activity virtual machine instances includes virtual machine instances utilizing one or more CPUs or other computing resources above a first threshold level, where the threshold level can be any one of 0%, 10%, 20%, 30%, 40%, 50%, 60%, 70%, 80%, 90%, 99% or another value. In one embodiment, low activity virtual machine instances include virtual machine instances utilizing one or more CPUs or other computing resources above a second threshold level, where the threshold level can be any one of 1%, 10%, 20%, 30%, 40%, 50%, 60%, 70%, 80%, 90%, 100% or another value. In one embodiment, first and second threshold levels are the same. For example, the threshold value can be 50%, with values above that threshold considered high activity values, values below that threshold considered low activity values, and values at the threshold considered as either high or low.

Under the quota scheduler 225, virtual machine instances with the above CPU usage profile can earn resource credits during the low activity levels. As these virtual machine instances spend a predominant amount of time operating at low activity levels, these virtual machine instances quickly gain resource credits. Once these virtual machine instances acquire enough resource credits to surpass a threshold level, the quota scheduler 225 can assign a high priority level, such as BOOST, that provides the virtual machine instances with priority access to CPU resources. The next time that the virtual machine instances enter a high activity level, they have a high priority level that allows them to preempt other, lower priority virtual machine instances. Furthermore, the quota scheduler 225 can limit the CPU usage of high activity virtual machine instances to create a reserve of unallocated CPU capacity. This reserve capacity can be allocated to the high priority virtual machine instances if they need it. Thus, these virtual machine instances are able to process operations and/or respond to user requests with low latency.

In one embodiment, owners or operators of virtual machine instances can be given the option to purchase additional resource credits so that their virtual machine instances receive higher priority levels for longer or more periods of time. In one embodiment, owners or operators of virtual machine instances may be charged more based on the number of high activity periods or spikes that virtual machine instance generates during a given time period.

Figure 4A:
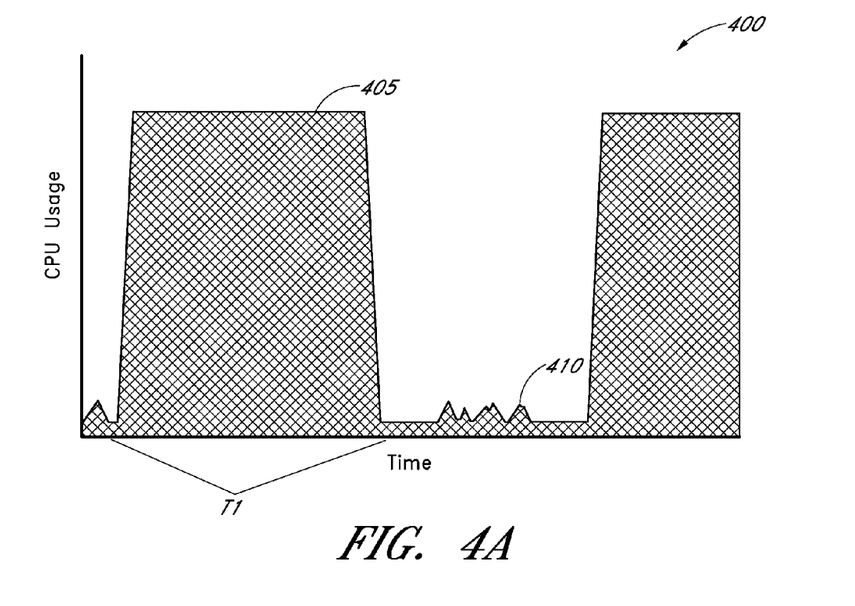
FIGS. 4A and 4B illustrate an example of a CPU usage profile of a virtual machine instance before and after applying a resource limit.
Figure 4B:
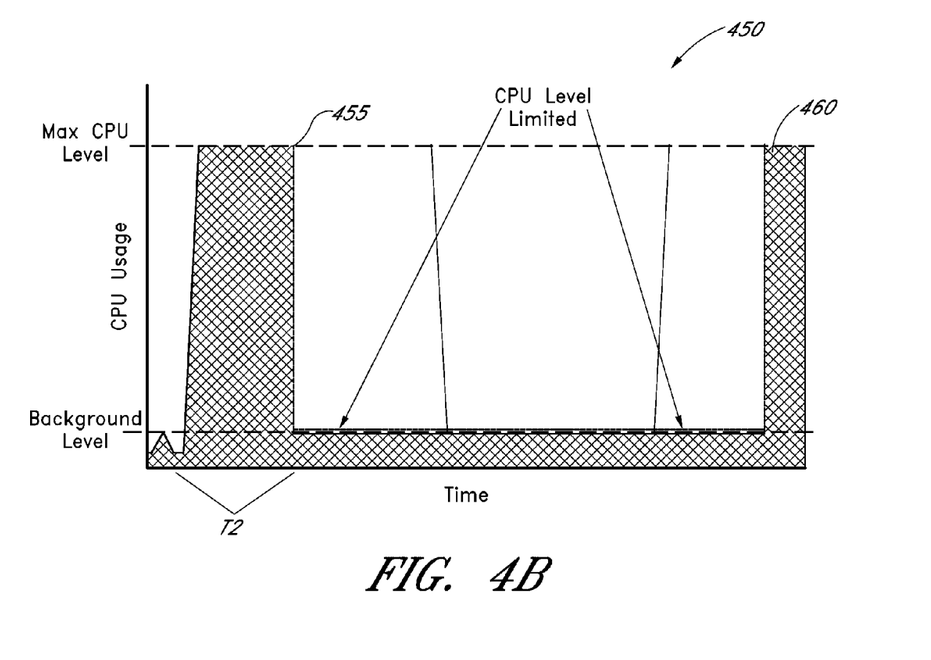

FIGS. 4A and 4B illustrate an example of a CPU usage profile of a virtual machine instance before and after applying a resource limit. FIG. 4A illustrates the CPU usage profile when no resource limit or capping is implemented. The virtual machine instance operates at peak level 405 for time T1, when it completes any pending operations. The virtual machine instance then operates at a low background level until additional operations are received for processing.

FIG. 4B illustrates the CPU usage profile once a resource limit or capping is implemented. After operating at a peak level 455 for time T2, the cap for the virtual machine instance is reached, causing the cap to be enforced. Subsequently, the virtual machine instance CPU usage is limited for some time until it regains enough qcredits for the cap to be removed. As a result of the CPU limiting, operation requests received by the virtual machine instance can experience high latencies as it may take some time to complete processing the operation at the limited CPU level.

Figure 5:
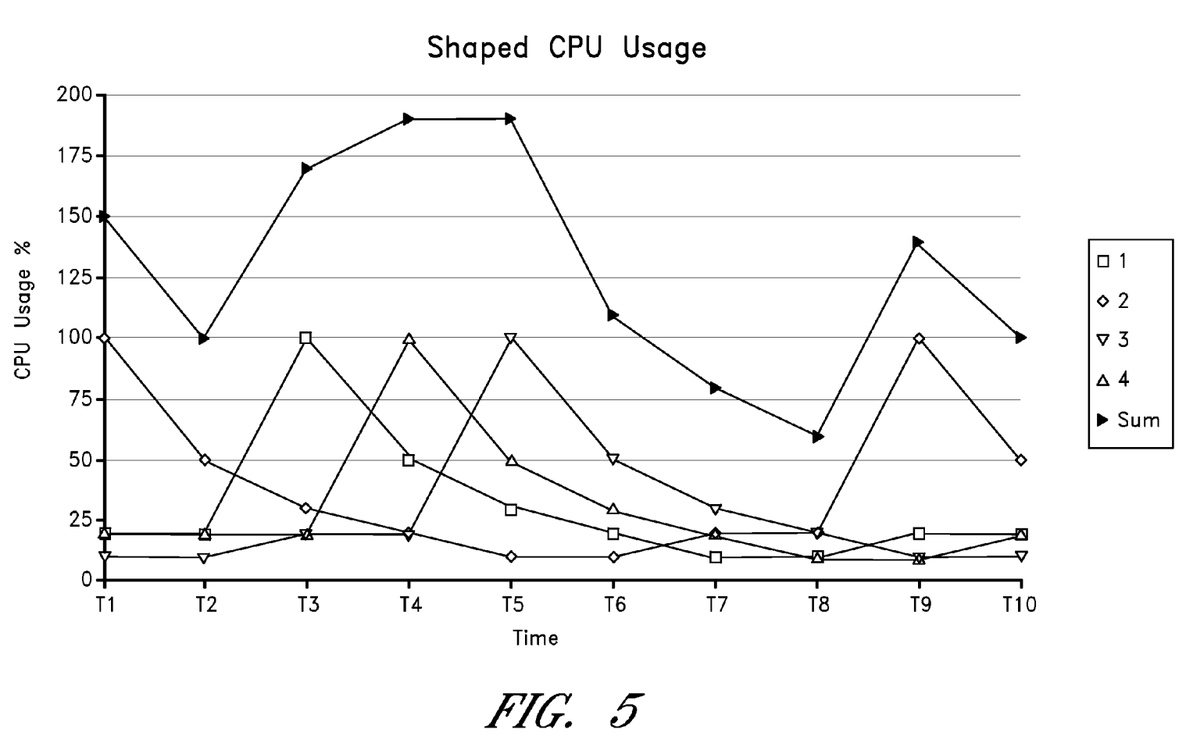
FIG. 5 illustrates a CPU usage profile for an example computing node with two CPUs operating 4 virtual machine instances.

FIG. 5 illustrates a CPU usage profile for an example computing node with two CPUs operating 4 virtual machine instances. Here 4 instances are contending for the CPU resources. Instance 1 starts off capped due to not having available qcredits, at time T3 it accumulates enough qcredits to be allowed to burst and is allowed to spike up to 100% for a short period and then it is gradually capped down again. Instance 2 starts out bursting at T1 and is capped down to a level where it is spending less that it is earning (qcredits), until it is allowed to burst once more at T9. Instance 3 and 4 begin capped until being allowed to burst at T4 and T5, respectively. The summary line illustrates that the QS is not work-conserving in this example as some capacity is reserved in order to allow bursting.

Figure 6:
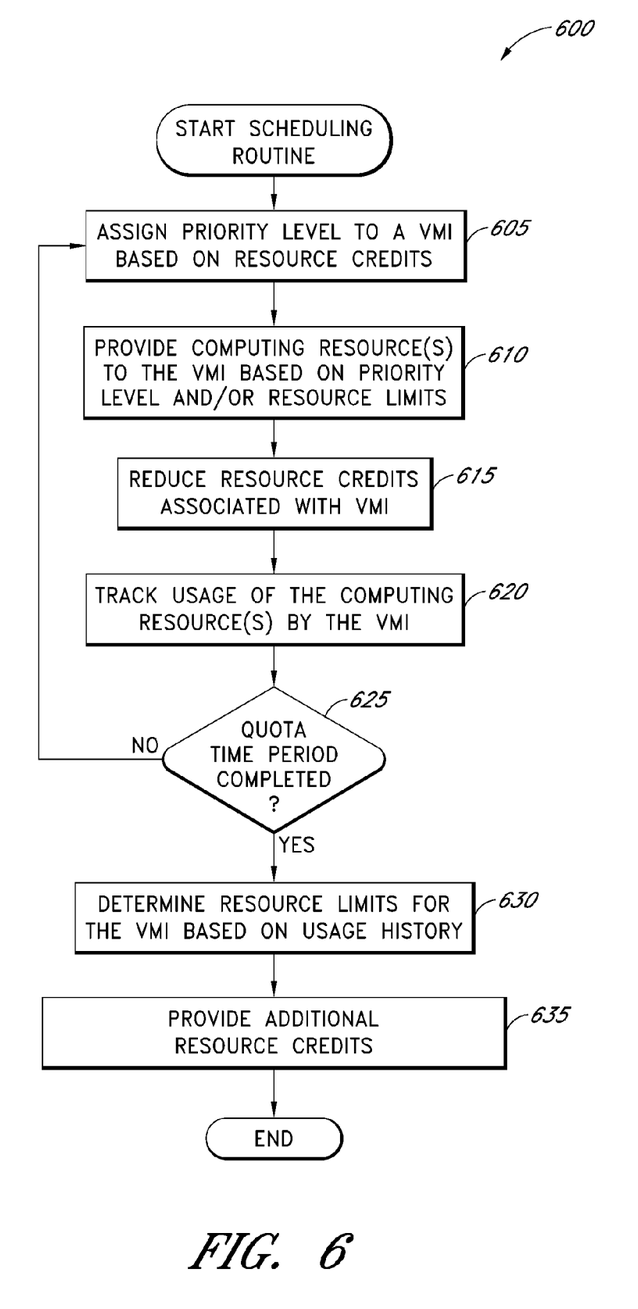
FIG. 6 illustrates a flow diagram for an embodiment of a scheduling routine.

FIG. 6 illustrates a flow diagram for an embodiment of a scheduling routine 600. For ease of explanation, the process will be described herein as performed by the resource scheduler 225; however, the process may be performed wholly or partially by any other suitable computing device, module or system, such as by the VM manager 124 or other components of the program execution service 100.

The resource scheduler 225 determines computing resource allocations for a time period, typically the current time period. However, in some embodiments, the resource scheduler may perform look-ahead scheduling and schedule resource allocations for one or more upcoming time periods, for example, through the use of queues. In one embodiment, the computing resource being scheduled is CPU time, though the routine may be used to schedule other computing resources such as memory or bandwidth. Further, the scheduling routing 600 may be used to schedule one or more virtual machine instances.

Beginning at block 605, the resource scheduler 225 assigns priority levels based on the resource credits to a virtual machine instance. In one embodiment, the priority levels assigned are one of BOOST, UNDER and OVER as described above. In one embodiment, the virtual machine instance is assigned a low priority if it has no resource credits or negative resource credits, a medium priority if it has positive credits, and a high priority if it has credits above a particular threshold value. However, other priority levels and based on other resource credits amounts are possible. In one embodiment, assigning a high priority to the virtual machine instance further removes any resource limits on the virtual machine instance.

At block 610, the resource scheduler 225 provides computing resources to the virtual machine instance based on resource credits and/or resource limits. In one embodiment, the computing resource is provided for a computing resource time slice (e.g. 30 ms). virtual machine instances may have both resource credits and resource limits that determine how much computing resources the virtual machine instance may utilize before being forced down to a low or idle activity level. If the virtual machine instance has a high priority level, it may be provided with priority access to computing resources over other virtual machine instances and allowed to operate up to the full capacity of the computing system. If it does not have a high priority level and/or it reaches its resource limit, then the amount of computing resources provided to the virtual machine instance may be limited and/or forced down to a low activity level.

At block 615, the resource scheduler 225 reduces the resource credits associated with the virtual machine instance based on the computing resource usage during previous time period(s). For example, if the virtual machine instance was operating at a high activity level during the previous time period, then a larger amount of resource credits are consumed than if the virtual machine instance was operating at a background level. If the virtual machine instance was not previously operating, then no resource credits are consumed.

In one embodiment, the time period referenced is the previous computing resource slice. In one embodiment, the time period referenced may be multiple time slices. For example, if the virtual machine instance operates at a high activity level for multiple time slices, then the amount of resource credits consumed can be gradually increased in order to limit hogging of computing resources.

At block 620, the resource scheduler 225 tracks the usage of the computing resource by the virtual machine instance. This information can be used to determine resource limits, resource credit additions and reductions, and/or pricing for virtual machine instances. This information may be stored in memory or other computer storage.

At block 625, the resource scheduler 225 determines whether a quota time period is complete. In one embodiment, the quota time period is the length of time between determinations of resource limits (e.g. 6 seconds in example above). Typically, the quota time period is longer than a computing resource time slice. For example, multiple CPU time slices (e.g. 30 ms in the example above) may pass before the quota time period ends. If the quota time period is not yet complete, the resource scheduler 225 loops back to block 605. If the quota time period is complete, the resource scheduler 225 proceeds to block 630.

At block 630, the resource scheduler 225 determines utilization caps for the virtual machine instance based on its usage history. In one embodiment, the usage history is determined from the tracked usage data in block 602. In some embodiments, the usage history is determined based on the resource credits of the virtual machine instance, as the amount of resource credits can indicate the relative share of the computing resource being consumed by the virtual machine instance in comparison to other virtual machine instances. For example, if its resource credits are increasing, then the virtual machine instance is likely utilizing less computing resources than other virtual machine instances on the computing node, while if the resource credits are decreasing, the virtual machine instance is likely utilizing more resources than other virtual machine instances.

In one embodiment, if the virtual machine instance has negative resource credits, then the resource cap for the virtual machine instance is decreased, thereby limiting the amount of computing resource the virtual machine instance can use. Cap reduction can be linear, asymptotic, geometric, or the like. In one embodiment, if the virtual machine instance has positive resource credits, then the resource cap may be removed. In one embodiment, the resource limit or cap is a numerical value associated with a virtual machine instance that can be removed by setting it to a null value, to zero, a negative value, a high value that is sufficiently high not to be limiting, or the like.

At block 635, the resource scheduler 225 provides additional resource credit to the virtual machine instance. In one embodiment, a predetermined number of credits are provided to the virtual machine instance. The amount of credits may be based on the number of virtual machine instances operating on the computing node. In one embodiment, the number of credits provided is dynamically based on the previous computing usage. For example, virtual machine instances using a relatively large amount of a computing resource may receive less resource credits so that its use of the computing resource decreases in future time periods. After block 635, the scheduling routine can end.

In one embodiment, the resource scheduler 225 provides additional resource credits if the virtual machine instance is booting up. By receiving additional resource credits, the virtual machine instance will tend to have a higher priority than other, non-booting virtual machine instances. Typically, a virtual machine instance takes some time to initially load as the operating system and/or applications are loaded from storage and are initially set up. Thus, it can be beneficial to prioritize virtual machine instances in the process of booting up so that a virtual machine instance can complete booting and be then ready to begin processing requests.

The priority of a booting VM may be raised in other ways in addition to or instead of by providing additional resource credits. In one embodiment, the resource scheduler 225 may raise or remove any cap on the virtual machine instance in order to allow it to initially burst for a longer amount of time. In one embodiment, the virtual machine instance may be allowed to burst for a predetermined period of time (e.g. 30 ms, 50 ms, 100 ms, or a sufficient time period that allows the virtual machine instance to complete booting).

For ease explanation, the resource credits are described in at least some sections of the disclosure as being negative or positive, with 0 as the dividing threshold between one priority level and another. However, as will be apparent, the dividing threshold can be selected arbitrarily and can be any number. The term "negative" can refer to any value below the threshold while "positive" can refer to any value above the threshold. In addition, the disclosure describes using resource credits to denote available resource time; however, other embodiments could use resource debits to denote used resource time, essentially flipping how the system tracks usage. In those embodiments, priority access may be given to virtual machine instances with the least resource debits.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for allocating computing resources in a virtualized environment, the method comprising:
   by a computer system comprising computing resources:
      providing resource credits to virtual machine instances on the computing system,
   wherein the resource credits associated with a particular virtual machine instance are consumed based on usage of the computing resources and unused resource credits are accumulated by the particular virtual machine instance;
   limiting usage of the computing resources by a first set of the virtual machine instances to a first resource limit, wherein individual virtual machine instances of the first set of virtual machine instances have resource credits below a threshold level; and
   providing access to the computing resources by a second set of virtual machine instances, wherein individual virtual machine instances of the second set of virtual machine instances have resource credits above the threshold level, wherein usage of the computing resources by individual virtual machine instances of the second set of virtual machine instances preempts usage of the computing resources by the first set of the virtual machine instances;
   wherein the first resource limit is a portion of available capacity of the computing resources, wherein unallocated capacity of the computing resources is reserved for use by the second set of virtual machine instances.

2. The method of claim 1, wherein limiting the usage by the first set of virtual machine instances to the first resource limit further comprises forcing down resource usage of the first set of virtual machine instances to the first resource limit.

3. The method of claim 1, wherein limiting the usage by the first set of virtual machine instances further comprises reducing usage of the first set of virtual machine instances asymptotically to zero over multiple processor time periods.

4. The method of claim 1, wherein a negative amount of resource credits is below the threshold level.

5. The method of claim 1, wherein the first resource limit is a maximum rate at which individual virtual machine instances having a number of resource credits below the first threshold level can utilize the one or more processors.

6. The method of claim 1, further comprising reevaluating the identification of the virtual machine instances in the first set and the second set at a determined interval.

7. The method of claim 1 further comprising identifying virtual machine instance that have resource credits above the threshold level.

8. A system for allocating resources in a virtualized environment, the system comprising:
- computing resources comprising one or more processors; and
- a scheduler configured to provide access to the computing resources by virtual machines instances that utilize the computing resources, the scheduler configured to:
  - allocating resource credits to the virtual machine instances, wherein resource credits are consumed based on utilization of the computing resources by a virtual machine instance and unused resource credits are accumulated by the virtual machine instance;
  - limiting usage of the computing resources by a first set of virtual machine instances to a first resource limit, wherein individual virtual machine instances of the first set of virtual machine instances have resource credits below a threshold level; and
  - providing priority access to a second set of virtual machine instances such that usage of the one or more processors by individual virtual machine instances of the second set of virtual machine instances preempts usage of the one or more processors by the first set of the virtual machine instances, wherein individual virtual machine instances of the second set of virtual machine instances have resource credits above the threshold level;
  - wherein the first resource limit is a portion of available capacity of the computing resources, wherein unallocated capacity of the computing resources is reserved for use by the second set of virtual machine instances.

9. The system of claim 8, wherein limiting usage of the computing resources includes forcing down usage associated with a virtual machine instance of the first set to the first resource limit.

10. The system of claim 9, wherein the usage is reduced asymptotically to zero over multiple processor time periods.

11. The system of claim 8, wherein the second set of virtual machine instances includes virtual machine instances previously idling for one or more processor time periods.

12. The system of claim 8, wherein the resource credits are allocated at periodic intervals, wherein the periodic intervals are continuous or discontinuous.

13. The system of claim 8, wherein the first resource limit is not greater than 10% of the computing capacity of the one or more processors.

14. The system of claim 8, wherein the priority access provides unlimited access to the one or more processors by one or more virtual machine instances of the second set for a time period of at least one second.

15. The system of claim 8 further comprising assigning the first priority level to virtual machine instances that have resource credits below the threshold level, and assigning the second priority level to virtual machine instances that have resource credits above the threshold level.

16. A non-transitory computer-readable storage medium having stored thereon instructions that, when executed, direct a computing system to perform a method comprising:
- allocating resource credits to virtual machine instances of a computing system, wherein resource credits are consumed based on utilization of computing resources by a virtual machine instance and unused resource credits are accumulated by the virtual machine instance;
- providing access to the computing resources by a first set of virtual machine instances at a first resource limit, wherein individual virtual machine instances of the first set of virtual machine instances have resource credits below a threshold level; and
- providing access to the computing resources by a second set of virtual machine instances such that the second set of virtual machine instances of the computing resources preempts access by the first set of virtual machine instances, wherein individual virtual machine instances of the second set of virtual machine instances have resource credits above the threshold level;
- wherein the first resource limit is a portion of available capacity of the computing resources, wherein unallocated capacity of the computing resources is reserved for use by the second set of virtual machine instances.

17. The storage medium of claim 16, wherein the computing resources include at least one of processor time, input or output operations, or memory.

18. The storage medium of claim 16 further comprising selecting a virtual machine instance of the second set of virtual machine instances having resource credits above the threshold level for priority access through a selection process.

19. The storage medium of claim 18, wherein the selection process is a round robin process.

20. The storage medium of claim 16 further comprising providing additional resource credits to one of the virtual machine instances of the computing system when additional resource credits are purchased for the one virtual machine instance of the virtual machine instances of the computing system.

* * * * *

UNITED STATES PATENT AND TRADEMARK OFFICE
CERTIFICATE OF CORRECTION

PATENT NO. : 9,535,736 B2
APPLICATION NO. : 14/578148
DATED : January 3, 2017
INVENTOR(S) : Atle N. Jorgensen et al.

It is certified that error appears in the above-identified patent and that said Letters Patent is hereby corrected as shown below:

In the Claims

In Column 15 at Line 5, In Claim 5, after "the" delete "first".

Signed and Sealed this
Eighteenth Day of April, 2017

Michelle K. Lee
*Director of the United States Patent and Trademark Office*